United States Patent

Johnson

[15] 3,688,182
[45] Aug. 29, 1972

[54] COMMUTING REACTOR FOR A THREE-PHASE INVERTER

[72] Inventor: Lauren L. Johnson, Westchester, Ill.

[73] Assignee: General Motors Corporation, Detroit, Mich.

[22] Filed: Nov. 9, 1970

[21] Appl. No.: 88,067

[52] U.S. Cl..................321/45 C, 321/5, 321/45
[51] Int. Cl..................................H02m 7/48
[58] Field of Search..........321/5, 8, 18, 44, 45, 45 C, 321/38

[56] References Cited

UNITED STATES PATENTS

| | | | |
|---|---|---|---|
| 3,354,370 | 11/1967 | Corry et al. | 321/45 C |
| 1,929,565 | 10/1933 | Sabbah | 321/38 X |
| 1,918,870 | 7/1933 | Sabbah | 321/38 |
| 2,009,834 | 7/1935 | Bedford | 321/38 |
| 2,094,820 | 10/1937 | Sabbah | 321/38 |
| 3,465,233 | 9/1969 | Johnston et al. | 321/45 C |
| 3,495,149 | 2/1970 | Swain | 321/45 C |
| 3,308,371 | 3/1967 | Studtmann, Jr. | 321/5 |

Primary Examiner—William M. Shoop, Jr.
Attorney—E. W. Christen and C. R. Meland

[57] ABSTRACT

A commuting reactor arrangement is combined with six controlled rectifiers to provide a three-phase inverter. In this inverter, the controlled rectifiers conduct in groups of three, each controlled rectifier being conductive 180° and nonconductive 180° of each cycle of 360 electrical degrees. The commuting reactors are used in combination with commuting capacitors to commute the controlled rectifiers at the conclusion of their respective conductive intervals. The commuting reactor arrangement of this invention utilizes a reactor core provided with three integral core legs, each carrying a center-tapped commuting reactor winding. In this arrangement, flux emanating from any reactor winding circulates in all three legs of the reactor core, thus reducing flux density in the core legs and providing magnetic reset of the core material after each commutation.

1 Claim, 4 Drawing Figures

INVENTOR.
Lauren L. Johnson
BY
C. R. Meland
ATTORNEY

COMMUTING REACTOR FOR A THREE-PHASE INVERTER

This invention relates to a commutation arrangement for a three-phase inverter circuit which provides commutation of the inverter's controlled rectifiers by means of commuting reactors.

Various commuting reactor arrangements are known for terminating conduction intervals in controlled rectifier inverters. In the main, these commuting reactor systems utilize a capacitor and a center-tapped reactor winding wound on a magnetic core for energy storage and transfer to effect commutation. In these circuits, each phase includes two controlled rectifiers serially connected with a center-tapped reactor winding across a DC input. Each reactor winding is carried by a separate reactor core and the center-tap terminal of the reactor winding provides an AC output terminal for supplying an electrical load. Two capacitors are connected between each output terminal and the respective DC input terminals to store energy for use in the commutation process. In operation, an energy discharge from a capacitor through half a reactor winding induces a voltage in the other half of that reactor winding to commute one of the two serially connected controlled rectifiers when the other is gated conductive. To accommodate three-phase electrical systems, the described arrangement is repeated three times.

By contrast with these known reactor commuting systems, the reactor arrangement of the present invention includes a single magnetic core having three integral core legs for carrying the three center-tapped reactor windings required in a three-phase inverter. In this manner, flux emanating from each of the reactor windings circulates in all three core legs reducing the flux density in the reactor core and providing magnetic reset.

The three-leg magnetic core of the present invention reduces flux density during inverter operation. Accordingly, a lower cost and simplified smaller core assembly is used as compared with the three independent and discrete cores required in the past for reactor commutation in three-phase inverter systems.

Accordingly, it is an object of the present invention to provide a three-phase inverter which includes commuting reactors wherein the three reactor windings necessary for commutation are carried on a single magnetic core which has three constituent core legs.

Another object of the present invention is to provide a three-phase inverter having a three-leg commuting reactor core of the type described which is of low cost and simplified design.

These and other objects and advantages of the present invention will be apparent in the light of the description included herein.

The following figures which are incorporated in the description illustrate the preferred embodiment of the present invention.

Figure 1:
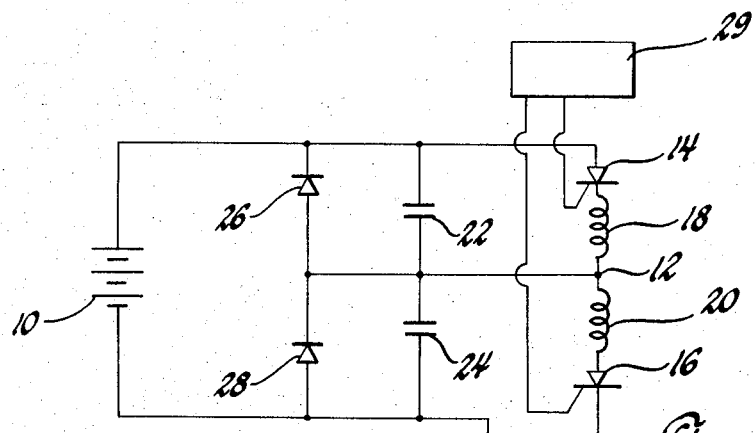
FIG. 1 is a circuit schematic of a prior art commuting reactor arrangement.

Referring now to the drawings, the general operation of a commuting reactor circuit will be described in conjunction with the prior art schematic of FIG. 1. This schematic depicts a single phase of a polyphase AC inverter system. A DC source shown as a battery 10 supplies energy for connection with an AC output terminal 12 sequentially through the pair of controlled rectifiers 14 and 16. These controlled rectifiers 14 and 16 are connected serially with two closely magnetically coupled reactor windings 18 and 20 across the terminals of the battery 10. As shown in the drawing, the output terminal 12 is provided at the junction of the two reactor windings 18 and 20 which, in practice, are carried by a common reactor core (not illustrated). Two capacitors 22 and 24 are connected respectively between terminal 12 and the positive and negative terminals of the battery 10. Two diodes 26 and 28 are connected between terminal 12 and the positive and negative terminals of the battery 10 such that they are respectively reverse biased by the battery terminal potentials. These diodes 26 and 28 permit reactive energy to be returned to the source, if necessary.

In operation, signals from the source of gate signals 29 sequentially initiate conduction in the controlled rectifiers 14 and 16. It should be appreciated that this source of gate signals 29 can take a variety of known forms and the block included in the drawing is merely illustrative. Its control of the switching frequency of controlled rectifiers 14 and 16 concomitantly determines the frequency of the voltage available at the output terminal 12.

Energy for commutation is alternately stored in the capacitors 22 and 24 for use in commuting the controlled rectifiers 16 and 14, respectively. Capacitor 22 is charged by battery 10 when controlled rectifier 16 is conductive through a path traced from the positive terminal of battery 10 through capacitor 22, through reactor winding 20, and through controlled rectifier 16 to the negative terminal of battery 10. And, in a similar manner, capacitor 24 is charged through a path which includes controlled rectifier 14 and reactor winding 18 when controlled rectifier 14 is conductive. Accordingly, if controlled rectifier 14 is conducting and a gate signal is supplied the controlled rectifier 16, a voltage will be induced in the reactor winding 18 which is effective to commute the controlled rectifier 14. When controlled rectifier 16 commences conducting, capacitor 24 is provided a discharge path through the reactor winding 20 and the controlled rectifier 16. The voltage developed in the reactor winding 20 induces a voltage in the reactor winding 18 having a polarity such that a reverse bias is applied to the controlled rectifier 14 terminating the conduction interval of the controlled rectifier 14. As noted above, capacitor 22 is charged while controlled rectifier 16 is conductive. This charge which is accumulated on the capacitor 22 provides a voltage of a polarity suitable for discharge through reactor winding 18 and the controlled rectifier 14 when controlled rectifier 14 is gated conductive. In this manner, controlled rectifier 16 is reverse biased and commuted by voltage induced in reactor winding 20 when controlled rectifier 14 is gated conductive connecting the voltage on capacitor 22 across reactor winding 18. While controlled rectifier 14 is conductive, capacitor 24 is recharged and one cycle of operation is thus completed.

This description has been limited to a single phase of a polyphase inverter. The complete prior art polyphase inverter includes a plurality of these single phase circuits. For example, in a three-phase inverter, the basic controlled rectifier commuting reactor circuit described would be reproduced three times to provide three AC output terminals. Three separate and magnetically isolated reactor cores would be used to carry the three reactor windings required. Of course, this inverter would be suitable for connection with a variety of loads, for example, the inverter could be connected with an AC motor. In any event, the process of commutation for each of the reactor commuting circuits would be identical with that described.

Figure 2:
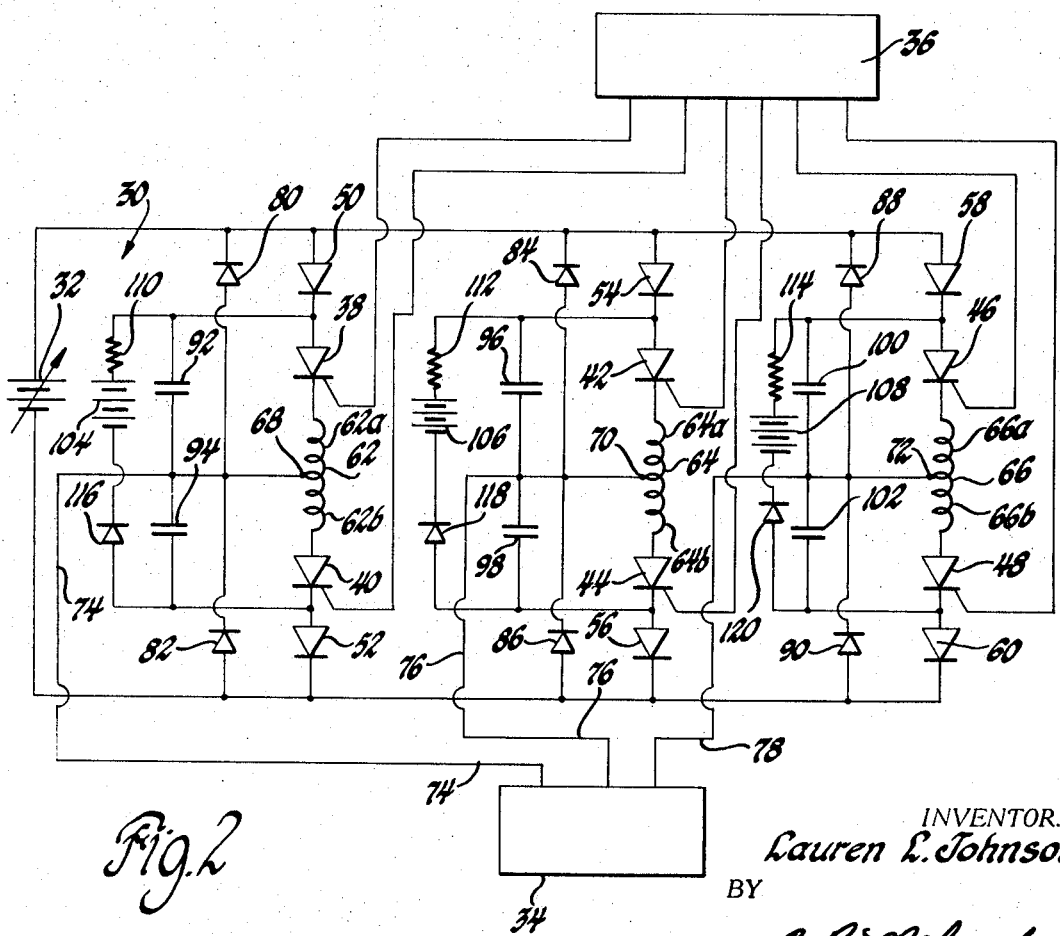
FIG. 2 is a circuit schematic of a three-phase inverter which includes commuting reactors carried by a common core in accordance with the present invention.

Referring now to FIG. 2, the three-phase inverter of this invention generally designated 30 is shown interconnecting a variable output voltage source of direct voltage represented as a variable voltage battery 32 and a three-phase load 34. The variable voltage output from the battery 32 is adjustable and is adjusted to accommodate varying load requirements. Although the variable voltage source is illustrated as a battery, it is understood that this is merely a convenient way of representing the variable voltage source 32 which, in practice, would take the form of a bridge rectifier providing an adjustable output voltage or some other known arrangement for developing a variable DC voltage output. The three-phase load 34 can take various forms including the windings of three-phase motors, resistive heating members, or combinations of these loads as would be encountered in an electrical supply system such as that used on locomotives. For the purposes of the following description, it is assumed that the load 34 is balanced.

Six controlled rectifiers 38 to 48, switched by trigger signals from a control module or trigger source 36, provide the basic power control of the inverter 30. The trigger source 36 can take various known forms. Trigger signals from the trigger source 36 determine the switching sequence for the controlled rectifiers to control the frequency of the power available from the inverter 30. Each phase of the inverter 30 includes two of the six controlled rectifiers 38 to 48 connected in a series circuit with a reactor winding and two diodes across the positive and negative terminals of the battery 32. The requisite six diodes are denoted 50 through 60 and the three center-tapped reactor windings are labeled 62, 64 and 66. Each reactor winding includes two closely magnetically coupled windings connected at the center-tap terminal. These windings are identified by indices *a* and *b*. Hence, windings 62*a* and 62*b* comprise center-tapped reactor winding 62. Similarly, windings 64*a*, 64*b*, 66*a* and 66*b* comprise reactor windings 64 and 66. Diode 50, controlled rectifier 38, center-tapped reactor winding 62, controlled rectifier 40 and diode 52 comprise one series circuit connected between the positive and negative terminals of battery 32. The center-tapped terminal 68 of the reactor winding 62 is connected with a conductor 74 to provide a first connection between the inverter 30 and the load 34. In a similar manner, diode 54, controlled rectifier 42, center-tapped reactor winding 64, controlled rectifier 44 and diode 56 are serially connected between the positive and negative terminals of battery 32. Terminal 70 of reactor winding 64 provides a second output terminal for the inverter which is connected by conductor 76 with the load 34. Conductor 78 interconnects the load 34 with terminal 72 of reactor winding 66 to complete the inverter output connections. This reactor winding 66 is included in the series circuit comprised of diode 58, controlled rectifier 46, reactor winding 66, controlled rectifier 48 and diode 60.

Six diodes 80 to 90 are included in the inverter 30 and are seen to interconnect the output terminals of the inverter 30 with the input from battery 32. The three diodes 80, 84 and 88 connect the positive terminal of battery 32 with terminals 68, 70 and 72, respectively. Similarly, diodes 82, 86 and 90 connect the negative terminal of source 32 with the output terminals 68, 70 and 72. It is noted that the six diodes 80 to 90 are reverse biased to be nonconductive by the battery 32. In operation, these six diodes provide a path for the return of reactive energy to the battery 32, if necessary.

Six commuting capacitors 92 to 102 store energy for commutation of the controlled rectifiers 38 to 48. Three auxiliary power supplies 104, 106 and 108 ensure that a minimum charge voltage is provided the capacitors 92 to 102 irrespective of the voltage applied by battery 32 to the six commuting capacitors. The six diodes 50 to 60 ensure that the commuting capacitors 92 to 102 are not discharged through the battery 32 when the sources 104, 106 and 108 charge them to a voltage level in excess of the voltage available from the battery 32. Additionally, the six diodes 50 to 60 prevent the auxiliary power sources from being drained by the battery 32 if the voltage available from the battery 32 is less than the voltage of the auxiliary sources 104, 106 and 108. The three resistors 110, 112 and 114 are included to limit the current load of the sources 104, 106 and 108. The diodes 116, 118 and 120 limit the auxiliary source currents to a single direction.

Figure 3:
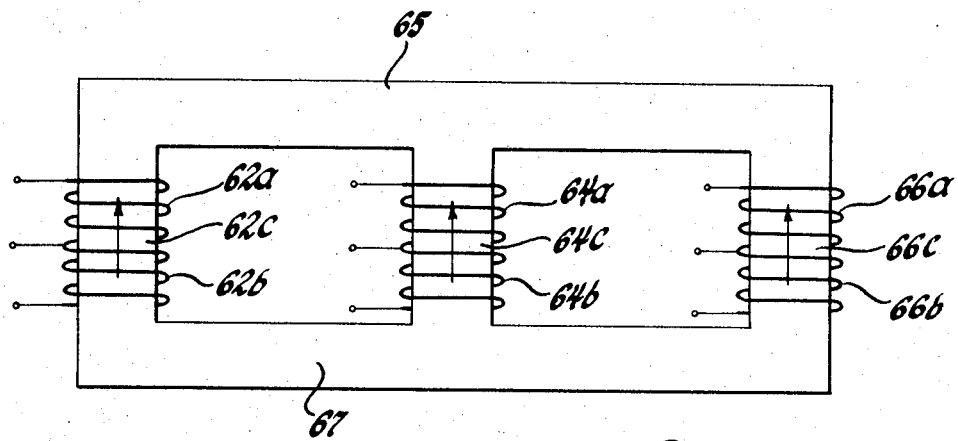
FIG. 3 is a pictorial view of the three-leg magnetic core included in the FIG. 2 inverter arrangement for carrying the three center-tapped reactor windings.

Commuting reactors 62, 64 and 66 are carried on the reactor core shown in FIG. 3. Each of the reactor windings is carried on a separate leg of a three-leg reactor core. The three integral core legs of the reactor core shown are labelled 62*c*, 64*c* and 66*c* to correspond to the reactor windings they carry. The reactor core has a uniform cross-sectional area providing closed magnetic paths for circulating magnetic flux including the three constituent core legs 62*c*, 64*c* and 66*c* and the two joining magnetic portions 65 and 67 interconnecting the three-core legs. When the reactor windings are energized, flux emanating from any one of the windings circulates in all three core legs. Inasmuch as current always proceeds from the top terminal of the windings 62*a*, 64*a* or 66*a* to the center-tap terminal of that winding or from the center-tap terminal to the bottom terminal of the 62*b*, 64*b* or 66*b* winding of a reactor winding, the flux created by the windings on each of the legs will have the direction indicated by the arrow in that leg. It is appreciated that the flux originating in a core leg and shown with an upward direction in that core leg will have a downward direction as it circulates through the other two core legs. Accordingly, the net flux in any one of the core legs will be dependent upon the current carried by each of the reactor windings. It is noted that all three reactor windings are identical and current is carried in only the *a* or *b* half of each winding at any given time.

Figure 4:
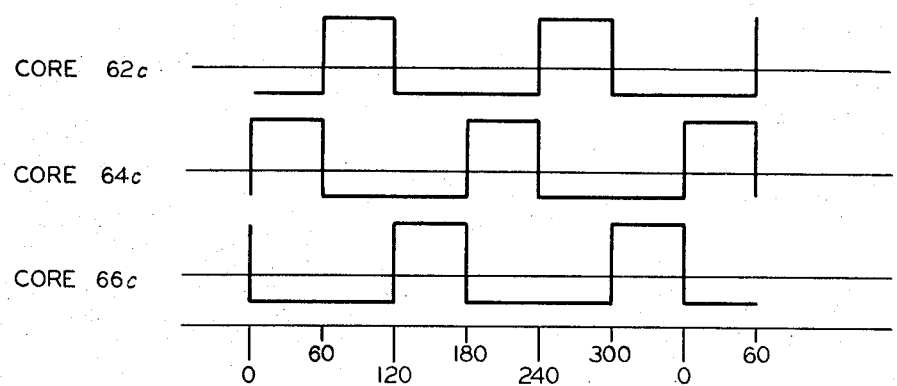
FIG. 4 is a graphical summary of the flux circulating in the three core legs of the magnetic core of FIG. 3 in response to currents in the three-phase inverter of FIG. 2.

In operation, controlled rectifiers 38 to 48 conduct in groups of three. Each controlled rectifier, therefore, is alternately conductive and non-conductive for 180 electrical degree intervals. In the balanced load situation, which has been assumed for this description, the currents of conductor 74, 76 and 78 cause flux levels in the three core legs 62c, 64c and 66c substantially as shown in FIG. 4. It is noted that the FIG. 4 representation is ideal and the actual flux will deviate from that shown; inductive loading and line imbalance will alter the waveforms displayed. FIG. 4 also represents the magnitude of the currents carried by the respective reactor windings inasmuch as current in the windings is proportional to flux generated in the cores. As seen in FIG. 4, the inverter switches every 60° altering the distribution of currents among the three reactor windings.

As noted above, each controlled rectifier is conductive 180° and nonconductive 180° of each cycle of 360 electrical degrees. The conductive intervals for the controlled rectifiers require to produce the flux graph of FIG. 4 are: controlled rectifier 38 conductive from 0° to 180° and nonconductive from 180° to 360° (0°) and controlled rectifier 40 nonconductive from 0° to 180° and conductive from 180° to 360°; controlled rectifier 42 conductive from 120° to 300° and nonconductive from 300° to 120° and controlled rectifier 44 nonconductive from 120° to 300° and conductive from 300° to 120°; and controlled rectifier 46 conductive from 240° to 60° and nonconductive from 60° to 240° and controlled rectifier 48 nonconductive from 240° to 60° and conductive from 60° to 240°. As is seen from the foregoing, the conduction intervals of each pair of controlled rectifiers of each phase complement each other. At any time, one rectifier of each phase is conductive and one is nonconductive. Additionally, it is noted that one controlled rectifier is gated conductive and one controlled rectifier is commuted every 60°.

At the start of an electrical cycle, controlled rectifiers 38, 44 and 46 are conductive as indicated above. Accordingly, the current carried by controlled rectifier 44 to the negative terminal of battery 32 is substantially the sum of the currents carried by controlled rectifiers 38 and 46 from the positive terminal of the battery 32. Hence, reactor winding 64 generates twice the flux of reactor windings 62 and 66. This is represented in FIG. 4 where core leg 64c is seen to have a net flux of twice the magnitude of the net flux in core legs 62c and 66c. While the controlled rectifiers 38, 44 and 46 are conducting, the capacitors 94, 96 and 102 are charged, in the manner described above with respect to FIG. 1, to the potential of the battery 32 or to the potential of the sources 104, 106 and 108 if that is greater. It is noted that the auxiliary sources 104, 106 and 108 provide the six capacitors with a continuous charge irrespective of the conduction of controlled rectifiers 38 to 48. This affords a minimum energy for commutation independent of the battery 32. In the situation under discussion, when controlled rectifier 48 is gated conductive at 60 electrical degrees, capacitor 102 discharges through winding 66b of reactor winding 66 to induce a voltage in winding 66a of reactor winding 66 which reverse biases and commutes controlled rectifier 46. This switching occurs, as noted, at the 60° point at which the controlled rectifier 48 is gated conductive. From 60° to 120°, controlled rectifier 38 carries the currents of both controlled rectifiers 44 and 48 and the reactor winding 62 generates a flux having a magnitude twice that of the fluxes of the other two legs of the reactor core. Further switching of the controlled rectifiers causes similar changes and the graph of FIG. 4 results.

The instant invention concerns the use of a single reactor core for carrying the three reactor windings. This arrangement affords a reduced flux density in the integral, magnetically connected reactor core legs and provides for magnetic reset as depicted in the FIG. 4 graph. These improvements enhance the commutation of the inverter controlled rectifiers and improve the performance of the reactor commutation circuitry.

The above description is merely exemplary and is not intended to be a limitation on the present invention.

I claim:

1. A three-phase inverter circuit comprising, first and second power input conductors, a source of direct current having opposite polarity terminals connected with said input conductors, a plurality of controlled rectifiers, three reactor windings each having a center tap, three electrical circuits connected in parallel across said input conductors, each electrical circuit including in a series connection a controlled rectifier having its anode connected to said first input terminal, a reactor winding and another controlled rectifier having its cathode connected to said second input conductor, the opposite ends of each reactor winding being connected between the cathode and anode of a respective pair of controlled rectifiers, the center taps on said reactor windings forming output terminals for said inverter, a three-phase electrical load connected with said output terminals, a commuting capacitor connected between each output terminal and one of the anode and cathode electrodes of each controlled rectifier, means coupled to said controlled rectifiers for gating them conductive in a three-phase sequence and in such a sequence that a controlled rectifier from each of said three electrical circuits is simultaneously conductive and such that for a given portion of a cycle a first controlled rectifier connects one of said output terminals to said first input conductor while second and third controlled rectifiers connect the other output terminals respectively to said second input conductor, said load being arranged such that load current passing through half sections of said reactor windings have magnitudes such that the current passing through the half section of the reactor winding connected to said first controlled rectifier is substantially the sum of the currents passing through the half sections of the reactor windings connected to said second and third controlled rectifiers, and a magnetic core having three constituent legs and portions interconnecting said core legs in closed magnetic paths, said reactor windings being respectively wound on said three core legs in such a fashion that flux generated in a core leg by a respective reactor winding is in the same direction in each core leg, the flux generated by said reactor winding which carries the sum of the currents of the other two reactor windings during a given period of operation opposing the flux generated by the other two reactor windings such that the net flux through the core legs carrying said other two reactor windings is in a reverse direction from that generated by its own reactor winding, each of said commuting capacitors providing commutation of a particular conducting controlled rectifier when the other controlled rectifier included in the same electrical circuit is gated conductive by discharging voltage accumulated on a commuting capacitor through one-half the reactor winding and the controlled rectifier gated conductive to thereby induce a voltage in the other one-half of the same reactor winding to reverse bias and commute the conducting controlled rectifier of the electrical circuit, said reactor core providing paths whereby, flux from each of said reactor windings circulates in all three integral core legs reducing flux density in each of the core legs and providing magnetic reset of the core material after each commutation, the gating sequence of said controlled rectifiers being such that commuting of a controlled rectifier takes place by a reactor winding which is carrying one portion of said sum of currents carried by one of said reactor windings.

* * * * *